United States Patent [19]

Johnson et al.

[11] Patent Number: 4,829,820

[45] Date of Patent: May 16, 1989

[54] VISUAL INDICATOR

[75] Inventors: Lenard W. Johnson; Thomas C. Johnson, both of Roseau, Minn.

[73] Assignee: LTJ Enterprises, Inc., Roseau, Minn.

[21] Appl. No.: 108,791

[22] Filed: Oct. 15, 1987

Related U.S. Application Data

[63] Continuation-in-part of Ser. No. 33,864, Mar. 31, 1987, Pat. No. 4,799,383, and a continuation-in-part of Ser. No. 910,231, Sep. 19, 1986, abandoned.

[51] Int. Cl.$^4$ .................. G01F 23/00; G01F 23/16
[52] U.S. Cl. .................. 73/290 R; 116/276; 116/227; 116/270
[58] Field of Search .................. 73/290 R, 296, 323; 116/109, 227, DIG. 7, 270, 276

[56] References Cited

U.S. PATENT DOCUMENTS

| | | | |
|---|---|---|---|
| 910,606 | 1/1909 | Swanson | 73/290 R |
| 1,298,950 | 4/1919 | Hull . | |
| 1,945,203 | 1/1934 | Schiske . | |
| 2,640,977 | 6/1953 | Parisi . | |
| 2,696,738 | 12/1954 | Lupfer . | |
| 2,764,645 | 9/1956 | Smith | 73/290 R |
| 2,888,898 | 6/1959 | Patterson | 73/323 |
| 3,011,470 | 12/1961 | Stoermer | 710/90 |
| 3,019,310 | 1/1962 | Hoff . | |
| 3,241,514 | 3/1966 | Grimland | 116/270 |
| 3,251,148 | 5/1966 | Knapp . | |
| 3,290,938 | 12/1966 | Miller | 73/290 R |
| 3,401,562 | 9/1968 | Reaney | 73/290 R |
| 3,443,437 | 5/1969 | Skalka . | |
| 3,492,968 | 2/1970 | Workman, Jr. | 116/270 |
| 3,550,447 | 12/1970 | Beresic . | |
| 3,703,879 | 11/1972 | Huthsing | 116/270 |
| 3,777,697 | 12/1973 | Woessner . | |
| 3,992,296 | 11/1976 | Nobuta | 116/276 |
| 3,994,169 | 11/1976 | Wolford | 73/290 R |
| 4,031,847 | 6/1977 | Sullivan | 116/270 |
| 4,043,199 | 8/1977 | Greer | 73/290 R |
| 4,157,036 | 6/1979 | Kivenson | 73/290 R |
| 4,343,184 | 8/1982 | Jaulmes | 73/323 |
| 4,366,708 | 1/1983 | Warihashi | 116/270 |
| 4,376,490 | 3/1983 | Mizusaki | 73/323 |
| 4,421,124 | 12/1983 | Marshall | 116/270 |
| 4,499,846 | 2/1985 | Bergeron et al. | 116/272 |
| 4,557,216 | 12/1985 | Demyon | 116/227 |
| 4,614,477 | 9/1986 | Hagenbuch | 73/296 |

FOREIGN PATENT DOCUMENTS

| | | | |
|---|---|---|---|
| 0068971 | 6/1982 | European Pat. Off. . | |
| 2258611 | 6/1973 | Fed. Rep. of Germany | 73/290 R |
| 2909609 | 9/1979 | Fed. Rep. of Germany | 116/227 |
| 2826409 | 12/1979 | Fed. Rep. of Germany | 73/290 R |
| 1008985 | 3/1952 | France | 73/290 R |
| 1421592 | 11/1965 | France | 73/290 R |
| 684114 | 11/1939 | German Democratic Rep. | 73/290 R |
| 41490 | 9/1965 | German Democratic Rep. | 73/290 R |
| 0540335 | 3/1956 | Italy | 73/296 |
| 2149113 | 6/1985 | United Kingdom | 73/290 R |

*Primary Examiner*—William A. Cuchlinski, Jr.
*Assistant Examiner*—Thomas B. Will
*Attorney, Agent, or Firm*—Merchant, Gould, Smith, Edell, Welter & Schmidt

[57] ABSTRACT

A gauge or indicator (20) for providing a positive on/off visual indication comprises a lens (22) and a transition mount (24) with a resilient diaphragm (32) secured therebetween to define a sealed chamber therein. The chamber is filled with an opaque liquid (34) and a contrasting plug (36) which is secured to the diaphragm (32) and movable therewith responsive to an actuator stem (38) between an "off" position obscured by the liquid and an "on" position wherein the plug is visible behind the lens (22) upon displacement of the liquid. Additional embodiments (50, and 70) are also disclosed.

20 Claims, 4 Drawing Sheets

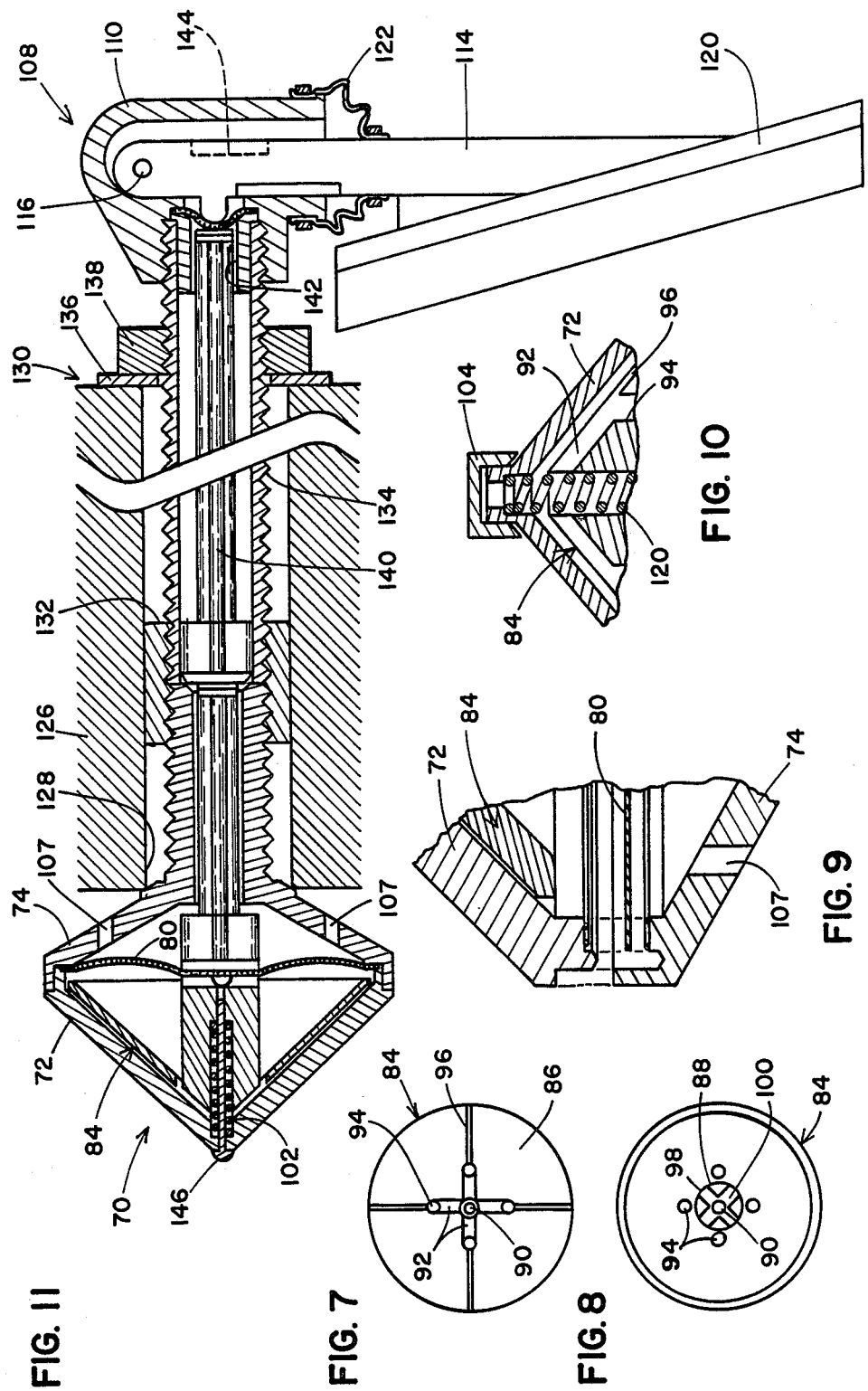

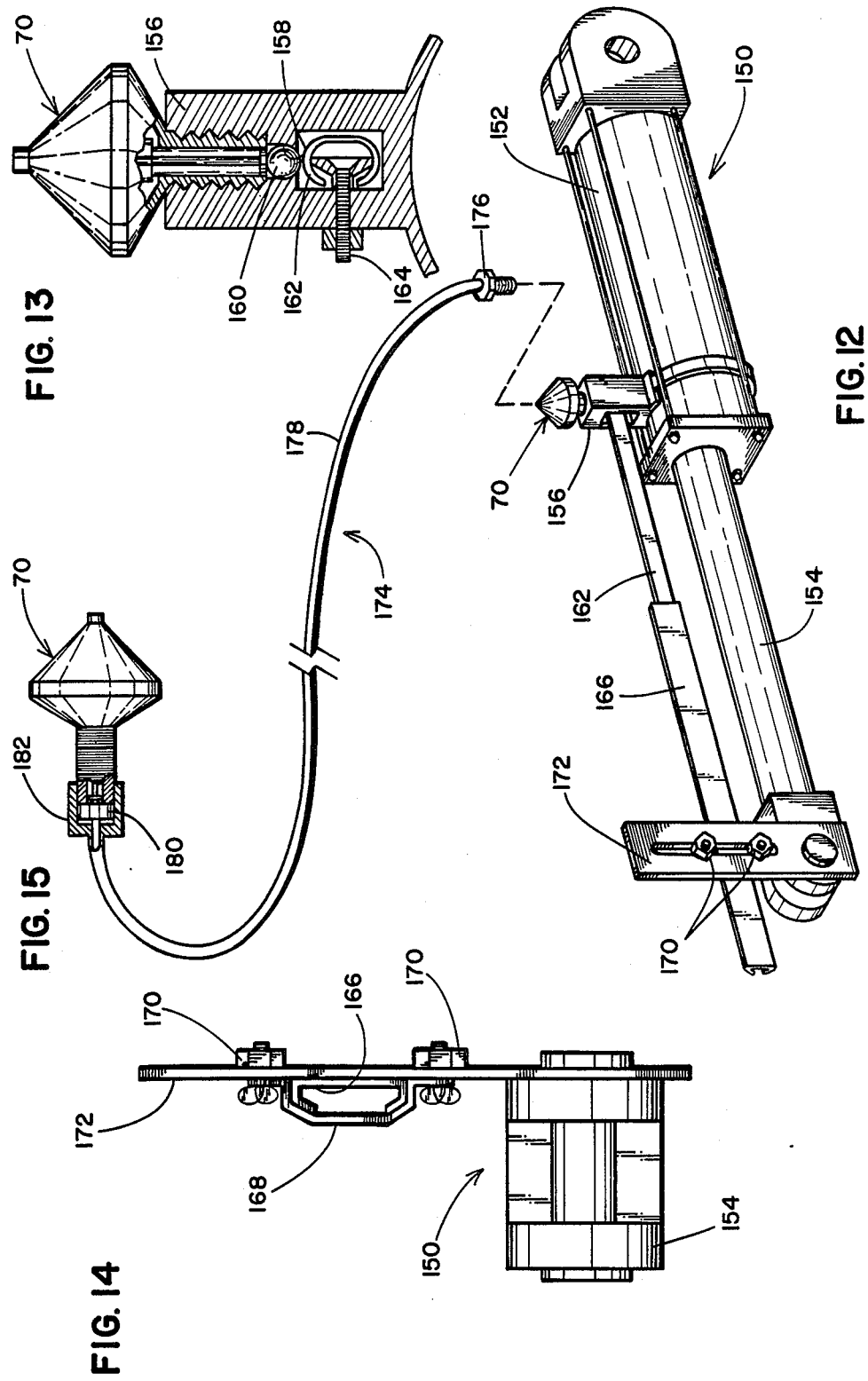

VISUAL INDICATOR

CROSS REFERENCE TO RELATED APPLICATION

This is a continuation-in-part of co-pending application of Ser. No. 033,064 filed Mar. 31, 1987, now U.S. Pat. No. 4,799,383, which is a continuation-in-part of co-pending application Ser. No. 910,231, filed Sept. 19, 1986, abandoned.

TECHNICAL FIELD

The present invention relates generally to an indicator device. More particularly, this invention concerns an indicator of simplified, inexpensive construction which is particularly adapted for use as a gauge mounted in the wall of a grain bin for providing a positive visual indication of the level of grain therein.

BACKGROUND ART

Storage tanks or holding bins are typically utilized to store corn or other types of grain. Such bins are usually about twenty feet high and can store between about 1,000 and 50,000 bushels or more of grain.

Keeping track of the amount of grain in such bins, however, has been a long-standing problem, to which there have been various approaches. One approach has been to track the number of truck loads of grain put in versus the number of truck loads removed from the bin. This of course requires use of trucks of the same size for loading and unloading, or if not, some computation to take into account different truck sizes. Another approach has been simply to climb a ladder on the side of the bin and knock on the wall, or look into the opening on the top of bin and count the number of exposed marking rings inside the bin. However, climbing ladders is tiring and time consuming, and can be dangerous—particularly at night and/or under adverse conditions when the ladder rungs are slippery from rain, dew, frost, sleet and the like. Yet another approach has been to put windows in the walls of the bins, however, these can quickly become dirty and the grain color therein usually does not provide enough contrast for easy viewing.

It will be appreciated that these prior approaches provide only rough approximations of material in the bin. A more accurate measurement of the grain in the holding bin is desirable, especially when using a grain dryer, which must be full to operate efficiently on a batch basis.

Level indicators for granulate storage tanks have been devised heretofore. For example, U.S. Pat. Nos. 3,290,938, 3,401,562 and 4,043,199 are representative of the prior art in this regard. These devices, however, have tended to be complicated and thus expensive.

A need has thus arisen for an improved visual indicator or gauge of simplified construction which will provide a positive, remote on/off visual indication of some condition, such as the level of grain in the bin without climbing any ladders.

SUMMARY OF INVENTION

The present invention comprises an improved visual indication which overcomes the foregoing and other difficulties associated with the prior art. In accordance with the invention, there is provided a visual indicator or gauge which is particularly adapted for use as a bin level gauge mounted in the wall of a grain bin or the like for providing a positive visual indication of the level of material therein. Moreover, although the present invention is particularly suited for use as a bin level gauge, it will be appreciated that it can be used in other applications wherein a positive on/off visual indication is desired. The gauge herein includes a substantially transparent or translucent lens and a transition mount. The lens is closed at its rear side by a resilient diaphragm to define a sealed chamber which is filled with an opaque liquid. Also located within the chamber is a filler bulb which is responsive to actuation by a slidable actuator stem that extends rearwardly from the indicator. The filler bulb is preferably of contrasting color and is normally obscured by the liquid in the lens. When the stem is actuated, the filler bulb displaces the opaque liquid so that it becomes visible through the lens, thereby providing a positive on/off indication. The stem can be actuated in various ways.

BRIEF DESCRIPTION OF THE DRAWINGS

A better understanding of the invention can be had by reference to the following Detailed Description in conjunction with the accompanying Drawings, wherein:

FIG. 7 and FIG. 8 are front and back views, respectively, of the plug of the third embodiment;

FIG. 9 is an enlarged, exploded partial section view of the joint between the lens, diaphragm and transition mount of the third embodiment;

FIG. 10 is an enlarged partial section view of the apex of the lens;

FIG. 11 is an enlarged vertical section view of a modification of the third embodiment of the visual indicator herein;

FIG. 12 is a perspective view of a cylinder arrangement incorporating the visual indicator herein for indicating partial extension or retraction hereof;

FIG. 13 is an enlarged vertical section view of the indicator mounted on the cylinder of FIG. 12;

FIG. 14 is an enlarged end view of the cylinder arrangement of FIG. 12; and

FIG. 15 is an illustration of an accessory for providing remote indication with the visual indicator of invention.

DETAILED DESCRIPTION

Figure 1:
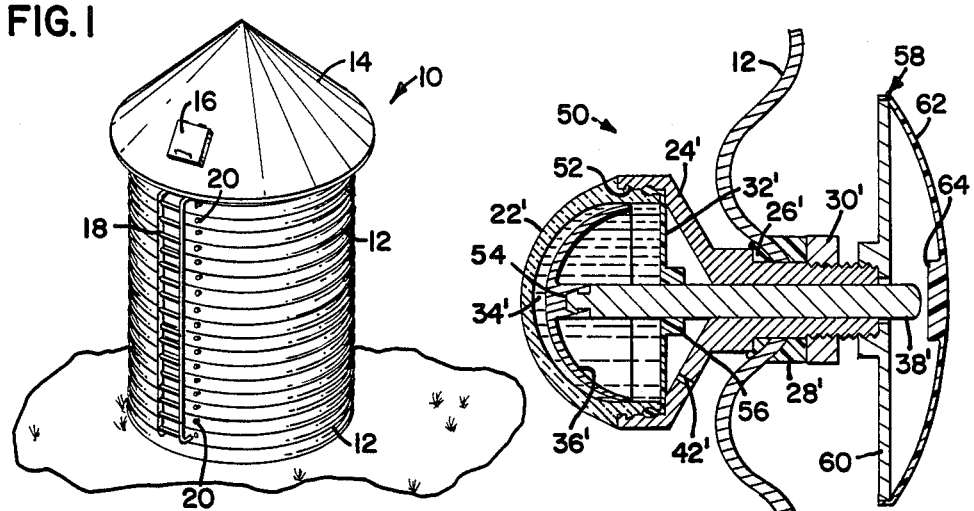
FIG. 1 is a perspective view of a grain storage bin incorporating several visual indicators of the invention.

Referring now to the Drawings, wherein like reference numerals designate like or corresponding elements throughout the views, and particularly referring to FIG. 1, there is shown a holding tank or storage bin 10 of the type utilized for storing wheat and other types of grain. The storage bin 10 includes a side wall 12, which can be smooth or corrugated as shown, and a roof 14 including a door 16 for loading grain or material into the bin by means of an elevator or auger from a truck (not shown). An outside ladder 18 is provided on the bin side wall 12. A series of indicators 20 incorporating the invention are also provided at vertically spaced apart, calibrated intervals in the side wall 12 of bin 10. As will be more fully explained hereinafter, each indicator 20 provides a positive on/off visual indication about the presence of material at that location, thereby providing an accurate indication of the amount of grain in the bin by setting its level between two adjacent indicators, one of which is "on" and the other of which is "off".

Although the indicator 20 of the present invention is particularly adapted for use as a bin level gauge in storage bins 10, of the stationary or mobile type, it will be understood that the invention can also be utilized in other applications wherein a positive on/off visual indication is desired.

Figure 2:
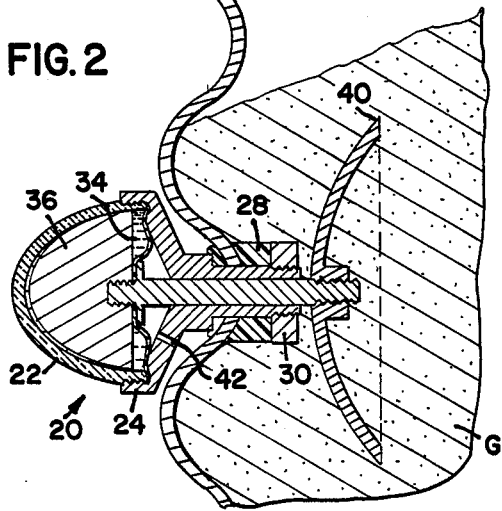
FIG. 2 is an enlarged vertical section view of a first embodiment of the visual indicator herein, shown in "off" and "on" positions.

FIG. 2 shows a pair of indicators 20 of the first embodiment mounted in the bin side wall 12. The upper indicator 20 is shown in the off position, while the lower indicator 20 is shown in the on position, responsive to pressure of the grain G. The indicator 20 includes a clear, transparent or translucent lens 22 which is threaded to a transition mount 24 extending through the bin side wall 12. The mount 24 is secured in place by means of a gasket 26 located between the outside of the bin side wall 12 and a shoulder on the mount, and a contoured pressure plate support or washer 28 and locking nut 30 on the inside of the bin side wall.

A resilient bladder or diaphragm 32 is secured between the lens 22 and mount 24 to define an internal chamber which is filled with a suitable opaque liquid 34 and a bulb or plug 36. The liquid 34 is preferably substantially opaque in order to obscure or block visibility of the plug 36 through lens 22. The plug 36 is preferably of high visibility, contrasting color. The resilient diaphragm 32 is clamped between the plug 36 and a slidable actuator stem 38 extending through a bore in the mount 24.

It will thus be appreciated that the contrasting plug 36 is normally supported by the diaphragm 32 in a retracted "off" position away from lens 22 with the opaque liquid 34 obscuring visibility of the plug. If desired, an additional compression spring can be provided for within fluid chamber 34 between plug 36 and lens 22 to provide additional pressure urging plug to the "off" position. However, the position of plug 36 is responsive to actuation of the stem 38, which can be actuated by various means. As shown, an actuator 40 is secured to the outer end of stem 38. It will be understood that the actuator 40 can be used in various styles. In the first embodiment, the actuator 40 takes the form of a cup-shaped pressure plate which forces the stem 38 outwardly, responsive to pressure of the grain G, as shown in the lower portion of FIG. 2, wherein the opaque liquid 34 is displaced so that the contrasting plug 36 becomes visible in order to provide an "on" indication through lens 22.

If desired, a vent 42 can be provided in the transition mount 24 behind the diaphragm 32 for pressure equalization and drainage of any accumulated moisture therein.

Figure 3:
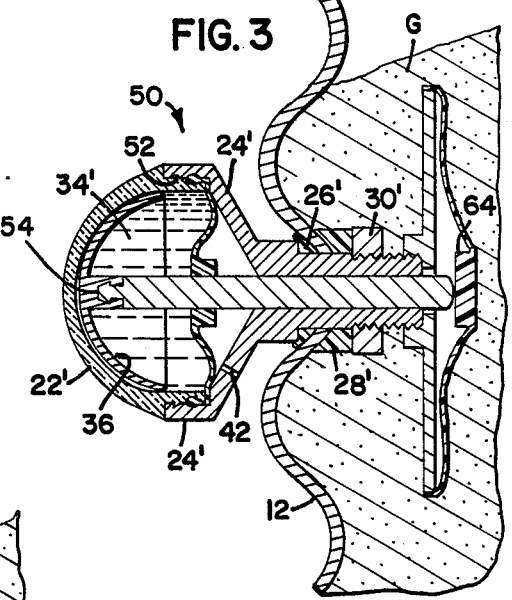
FIG. 3 is an enlarged vertical section view of a second embodiment of the visual indicator herein, shown in "off" and "on" positions.

FIG. 3 shows a visual indicator 50 in accordance with the second embodiment. The indicator 50 includes several components which are substantially similar to those in the first embodiment. Accordingly, the same reference numerals have been used to identify such components, but have been differentiated therefrom by means of prime (') notations.

The indicator 50 includes a lens 22' and transition mount 24', which are preferably secured together by means of a snap connection 52, instead of a threaded connection as in the first embodiment. The plug 36' is of hollow instead of solid configuration, and is secured to one end of the actuator stem 38' by means of a snap connection 54. The diaphragm 32' includes a raised boss 56 about its central opening by which it is adhesively secured or otherwise fixed to the stem 38'.

The indicator 50 also incorporates a sealed actuator 58 comprising a plate 60 which is threaded in fixed position to the end of the transition mount 24'. A resilient dome 62 with a raised boss 64 on the inside thereof, is secured over plate 60 and the protruding end of the actuator stem 38 in sealed relationship to protect against clogging and contamination. The resilient dome 62 collapses onto the actuator stem 38' responsive to pressure of liquid or granular material G as shown in the lower portion of FIG. 3.

Indicators 20 and 50 herein both include chambers oriented substantially horizontally, in line with the actuator stems. If desired, vertical chambers can be used with the filler plugs taking the form of floats normally urged to their off positions by buoyancy. The floating filler plugs could be cammed by the actuator stems to their on positions.

Figure 4:
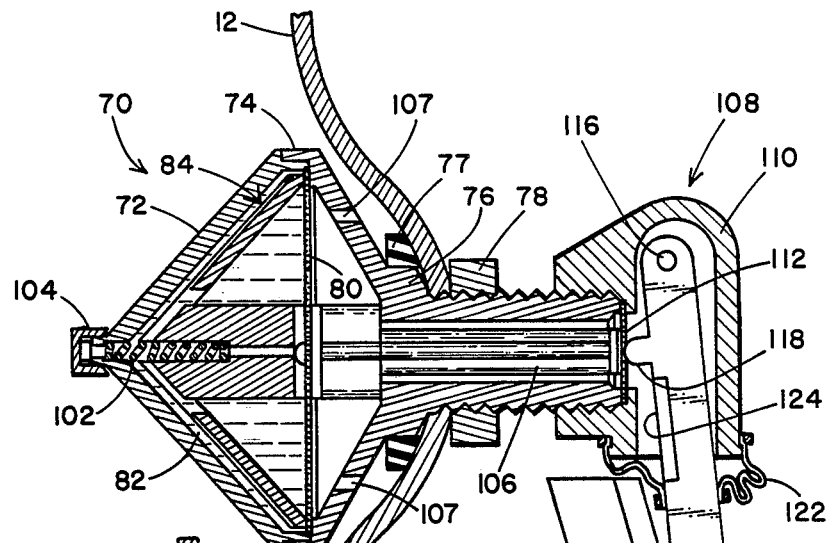
FIG. 4 is an enlarged vertical section view of a third embodiment of the visual indicator herein, shown in the "off" position.
Figure 5:
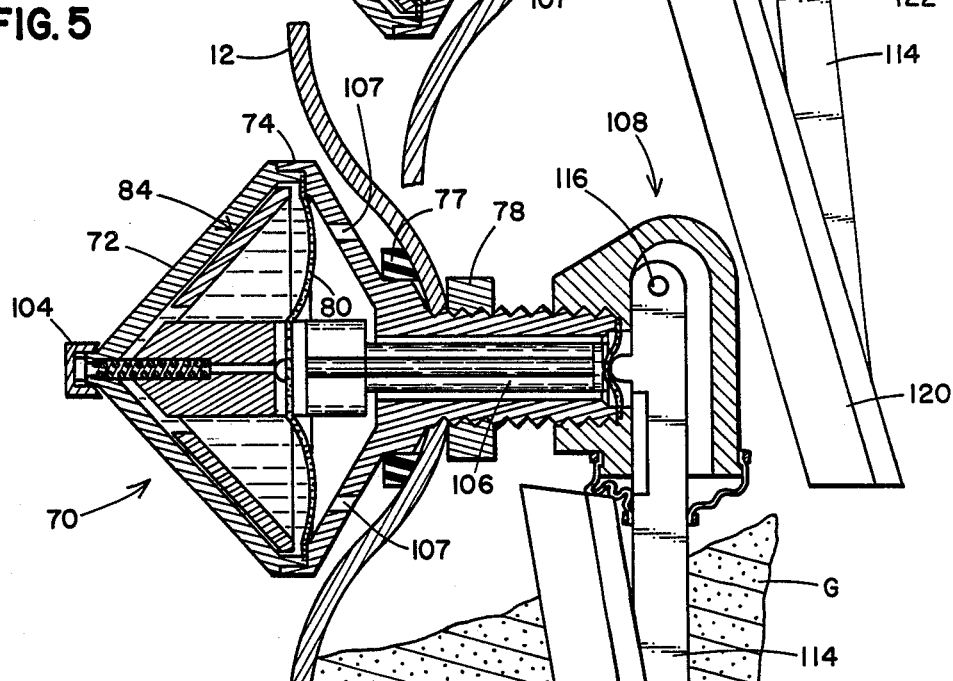
FIG. 5 is a view similar to FIG. 4, but in the "on" position.

FIG. 4 and FIG. 5 show a pair of indicators 70 of the third embodiment herein mounted in a bin sidewall 12. The indicator 70 of FIG. 4 is shown in the "off" position, while the indicator shown in FIG. 5 is in the "on" position responsive to pressure of the grain G. The indicator 70 includes several components which function similarly to those in the indicators of the first and second embodiments herein, but which are of somewhat different design for improved operation, as will be explained more fully hereinafter.

The indicator 70 includes a clear, transparent or translucent lens 72 which is secured to a transition mount 74 extending through the bin sidewall 12. The lens 72 is preferably of conical shape, and both the lens and transition mount 74 are preferably formed of suitable plastic, such as LEXAN polycarbonate. The lens 72 and transition mount 74 can be secured together by ultrasonic welding or other suitable technique. The mount 74 preferably includes an enlarged boss with a chamfer 76 on its outside end opposite lens 72 in order to facilitate positioning and alignment of the indicator 70 within the mounting hole in the bin sidewall 12. A resilient collar or foam gasket 77 is preferably provided between the mount 74 and the outside of the bin sidewall 12 as shown for sealing purposes. It will be appreciated that the outside end of he mount 74 is divergent as shown for connection to the lens 72, while the inside end of the mount is reduced and threaded to extend through the hole in the bin sidewall 12 and to receive a locking nut 78 thereon. The locking nut 78 can also be formed of similar suitable plastic.

A resilient bladder or diaphragm 80 is secured between the lens 72 and mount 74 to define a closed internal chamber which is filled with a suitable opaque liquid 82 and a bulb or plug 84 of contrasting color. Details of the joint between lens 72, mount 74, and diaphragm 80 are best seen in FIG. 9. Overlapping circular nubs are provided on opposite adjoining flat surfaces of the lens 72 and mount 74, as shown, in order to clamp the periphery of the diaphragm therebetween. The liquid 82 within lens 72 is preferably dark and substantially opaque in order to normally obscure or block visibility of the plug 84 through lens 72. For example, the liquid 82 can be an antifreeze-like solution comprising about 50% propylene glycol, 25% dye, and 25% water. Other suitable liquids could also be used depending upon the application. The plug 84 is preferably of high visibility, contrasting color. For example, the plug 84 can be fluorescent orange, yellow or other suitable color.

If desired, a reflector (not shown) or a surrounding backplate (not shown) of contrasting light color, such as white, can be provided between the indicator 70 and the bin 10 to highlight the color condition thereof for even better visibility.

The plug 84 is preferably of complementary conical shape. This comprises an important feature of the invention because it facilitates self-centering between the plug and lens 72 without additional guides which could bind and thus interfere with smooth operation of the indicator 70.

The constructional details of plug 84 are best seen in FIGS. 7 and 8. The plug 84 includes a generally conical face 86 adjoining lens 72, and a central opposite extending base 88 adjoining the diaphragm 80. An axial hole 90 extends through the base 88 and opens into intersecting notches 92 on the face 86. Holes 94 are provided within the notches 92 for fluid communication. Similarly, radial grooves 96 are provided in the face 86 between notches 92 and the outer edge of the plug 84 for fluid communication. The holes 90 and 94 and notches 92, and grooves 96 facilitate fluid communication across the plug 84 to avoid a suction lock when the plug in lens 72 are close together if not in contact. They also facilitate purging of air from within the chamber when being filled with the liquid 84. When filling the indicator 70 the liquid is injected through a hole at the apex of the lens 72, as shown in FIG. 10, and through the hole 90 of the plug 84 as the indicator is held upright and the plug 84 is pressed upwardly so that any air is purged upward and outward. A pair of crisscrossing notches 98 and 100 are preferably provided in the end of base 88 for fluid communication during filling so that the diaphragm 80 does not seal the hole 90. The plug 84 thus floats freely within the chamber between lens 72 and diaphragm 80, guided between its on and off positions by the self-aligning characteristics of its conical face 86 and the conial lens 72. The plug of the third embodiment is not secured to the diaphragm as in the first and second embodiments.

Referring again to FIGS. 4, 5 and 10, a small compression return spring 102 is preferably provided between the lens 72 and plug 84. The spring 102 is located between a seat formed within the hole 90 extending through the base 88 of plug 84 and a seat in lens 72. A closure cap 104 is secured over the outer apex of the lens 72. The cap 104 is likewise preferably formed of plastic ultrasonically welded in place over the fill hole in lens 72 after filling of the opaque blocking liquid 82 therein and purging of air from within the lens.

The periphery of diaphragm 80 is secured between lens 72 and the transition mount 74, as explained above in order to define a sealed internal chamber for the liquid 82 and plug 84 on one side of the diaphragm.

A slideable actuator stem 106 on the other side of the diaphragm 80 extends through a bore in the transition mount 74. The actuator stem 106 includes opposite raised and reduced ends. The raised end is positioned between the inside of the transition mount 74 and the back side of the diaphragm 80, against which it bears directly. The reduced end extends through the central bore of the transition mount 74 for actuation responsive to the material in the bin 10. The step between the raised and reduced portions of the actuator stem 106 engages the transition mount 74 in the off position of the indicator 70 in order to retain the stem therein with the diaphragm 80 in its unbiased position. There is no direct connection between the diaphragm 80 and the actuator stem 106, just bearing contact.

Figure 6:
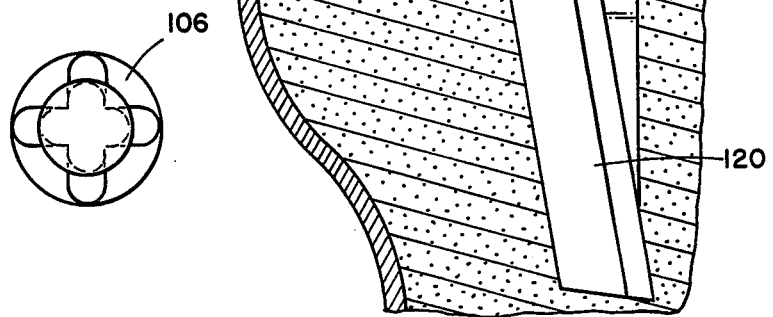
FIG. 6 is an enlarged end view of the actuator stem.

In accordance with the preferred construction, the actuator stem 106 is of X shaped or "dart-like" configuration, at least along the reduced end thereof as shown in FIG. 6, in order to reduce the contact area and thus friction between the stem and the transition mount 74 in the interest of smooth operation. Vents 107 are preferably provided in the transition mount 74 for pressure equalization and drainage of any condensation which might accumulate therein. Five or more vents 107 located at equally spaced intervals are provided so that at least one will be below the level of the actuator stem 106 in any rotational position of the indicator 70.

The visual indicator 70 includes an actuator 108 which is secured to the end of the transition mount 74 inside bin 10. The actuator 108 is responsive to pressure of grain G to urge stem 106 outwardly, turning the indicator 70 on. In particular, the actuator 108 includes a housing 110 which is screwed on to the reduced and threaded end of the transition mount 74 over a second resilient diaphragm 112. The second resilient diaphragm 112 functions as a dust seal to prevent dirt and other material from entering the bore of transition mount 74 and interfering with free slideable movement of the actuator stem 106. The second diaphragm 112 also functions as a backup seal to prevent the liquid 82 from entering the bin 10 and possibly contaminating the material G therein in the event of failure or leakage of diaphragm 80. The addition of a second diaphragm 112 is thus an important feature of the third embodiment of the invention.

A pivotal arm 114 is provided within the housing 110 of actuator 108. The upper end of arm 114 is supported by a transverse pin 116 for pivotal movement about a generally horizontal axis. A raised contact 118 on the upper end of the pivotal arm 114 engages the second diaphragm 112 directly opposite the adjacent end of the actuator stem 106, as shown.

A pressure plate 120 is secured to the lower end of the pivotal arm 114, which extends downwardly from the housing 110. The pressure plate 120 is preferably mounted at a suitable angle such as about 10° off vertical, depending upon the particular angle of repose of the material G in bin 10 for best sensitivity and response. The plate 120 is angled downwardly and away from this bin sidewall 12 so that there will be room for it to move in response to a change in material level.

In accordance with the preferred construction, a small resilient bellows 122 is provided between the lower end of the housing 110 and the pivotal arm 114 of actuator 108 in order to prevent dust and the like from entering into the housing. The lower end of the housing 110 beneath the second diaphragm 112 is also adapted to function as a deadstop for arm 114 to avoid over-travel of the actuator stem 106. A portion 124 of the pivot arm 114 adjacent the deadstop portion of the housing 110 is preferably beveled as shown in order to push away any material that might become lodged between the housing and the arm and thus interfere with operation of the indicator 70.

FIG. 11 shows a modification of the visual indicator 70 herein for use in a bin 10 having a thick wall 126 instead of a relatively thin corrugated wall 12 as shown elsewhere herein. In the modification shown the reduced threaded end of the transition mount 74 extends into the outside end of a hole 128 in the bin sidewall 126. An adaptor 130 connects the visual indicator 70 with the actuator 108 located inside the bin. In particular, the adaptor 130 comprises a coupling 132 interconnecting the reduced and threaded end of the transition mount 74 with a hollow extension 134 extending outwardly from the other end of the hole 128. The extension 134 is preferably externally threaded as shown, and is secured in place by a washer 136 and nut 138. A slideable connecting stem 140 is provided inside the extension 134. The internal diameter of the extension 134 is preferably larger than that of the reduced and threaded end of the transition mount 74 in order to form a seat at the junction, which in turn serves as a stop for limiting movement of the connecting stem and thus over-travel of the actuator stem 106 in the visual indicator 70. A bushing 142 is provided at the other end of the extension 134 for slideably supporting the reduced end of the connecting stem 140. The actuator 108 and the second diaphragm 112 are thus mounted on the end of the adaptor 130 which in turn functions to mechanically connect the actuator and the visible indicator 70.

If desired, a recess 144 can be provided inside the housing 110 of actuator 108, such as in a portion of arm 114 as shown, for receiving some insect repellant. An axial guide pin 146 with an upset head can also be provided between lens 72 and transition mount 74, if desired, instead of cap 104. The use of a guide pin between the lens and free plug may be desirable with non-conical configurations thereof.

Referring now to FIGS. 12–14 there is shown another possible application for the visual indicator 70 herein. It should be appreciated that the visual indicator 70 herein will operate in any orientation and is capable of use in various applications wherein a nonpowered on/off indication of some condition is required. Various such applications are envisioned. One is shown which also lends itself to agriculture usage, not for indicating the presence or level of material in a bin or other container, but rather for indicating the degree of extension of a cylinder and thus the depth of a working tool driven thereby on tillage equipment, for example. FIG. 12 shows a fluid cylinder assembly 150 including a base 152 and an extending rod 154. The length of the cylinder assembly 150 is responsive to hydraulic or pneumatic actuation to control a working tool (not shown). The visual indicator 70 can be adapted to indicate the extent of extension or retraction of the piston rod 154. In particular, the indicator 70 is secured to a mount 156 including a seat 158, as shown in FIG. 13. A ball 160 rests in the seat 158 between the actuator stem 106 of the indicator 70 and a rod 162 which is secured at one end to the mount 156 by a connector 164. The other end of the rod 162 telescopes within a larger outer rod 166 which is secured by a clamp 168 and connector 170 to a bracket 172 attached to the end of the piston rod 154. As the piston rod 154 retracts, the outer rod 166 telescopes over the inner rod 162 and engages the ball 160 to actuate the visual indicator 70. The point of actuation depends upon the adjustment between bracket 172 and the outer rod 166. This is but one example and various other applications are possible.

FIG. 15 shows an arrangement for providing a remote indication, in the event the visual indicator 70 cannot be secured directly to the mount 156. An adaptor 174 can be provided between the mount 156 and the remote mounting site of the indicator 70. In particular, the adaptor 174 comprises a fitting 176 which is secured to the mount 156 over the actuator ball 160 in place of the transition mount 74. The fitting 176 is connected by a tube 178 containing a flexible longitudinal member 180 opening into another fitting 182 at the other end connected to the transition mount 74 of the visual indicator 70.

From the foregoing, it will thus be apparent that the present invention comprises an improved indicator having several advantages over the prior art. One significant advantage is that the blocking liquid is located completely outside of the container or bin so that no contamination of the material therein can occur. Instead of displacing contrasting liquid between a bladder and a bulb, as in the gauge shown in my first application, the gauge herein utilizes the liquid to block or expose visibility of a contrasting plug responsive to an actuator stem. The gauge herein has better sensitivity and visibility, more positive operation, and can be used in bins wherein the material is recirculated—as well as in various other applications. Other advantages will be evident to those skilled in the art.

Although particular embodiments of the invention have been illustrated in the accompanying Drawings and described in the foregoing Detailed Description, it will be understood that the invention is not limited only to the embodiments disclosed, but is intended to embrace any alternatives, equivalents, modifications and-/or rearrangement of elements falling within the scope of the invention, as defined by the following claims.

What is claimed is:

1. A visual indicator, comprising:
   a transition mount having opposite ends;
   a conical lens secured to the one end of said transition mount, said lens having inside and outside surfaces;
   a resilient diaphragm secured between said lens and said transition mount to define a sealed chamber with said lens;
   a filler plug disposed within the sealed chamber, said plug being movable toward and away from said lens;
   said plug having a conical front side facing the opposite complementary inside surface of said lens, and a back side;
   means for normally biasing said plug away from said lens;
   means defining at least one passage for fluid communication across said plug;
   a substantially opaque liquid normally disposed within the sealed chamber between said lens and said plug in order to block visibility of said plug through said lens; and
   actuator means including a stem operatively associated with said diaphragm and extending out the other end of transition mount for actuating said plug toward said lens in order to displace said liquid and thereby visually expose said plug through said lens.

2. The indicator of claim 1, wherein said lens is substantially transparent.

3. The indicator of claim 1, wherein said lens, transition mount, and filler plug are formed from plastic.

4. The indicator according to claim 3, wherein said actuator stem is formed from plastic.

5. The indicator of claim 1, further including: a pressure plate secured to the stem of said actuator means.

6. The indicator according to claim 5, wherein said pressure plate is pivotal.

7. The indicator of claim 1, further including: a plate secured to the other end of said mount; and
a resilient cover secured to said plate over said actuator stem.

8. The indicator of claim 1, wherein said diaphragm is secured to the stem of said actuator means so that said plug is normally biased away from said lens by said diaphragm.

9. The indicator of claim 1, wherein said plug is of contrasting color from said opaque liquid for high visibility.

10. The indicator of claim 1, wherein said liquid comprises an antifreeze solution of propylene glycol, water, and dye.

11. The indicator of claim 1, wherein said transition mount includes a plurality of vent holes.

12. The indicator of claim 1, wherein the other end of said transition mount is externally threaded, and further including a locking nut thereon.

13. A visual indicator, comprising:
a transition mount having opposite ends;
a lens secured to one end of said transition mount;
a resilient diaphragm secured between said lens and said transition mount to define a sealed chamber with said lens;
a filler plug disposed within the sealed chamber, said plug being movable toward and away from said lens;
adjacent surfaces of said lens and said filler plug being generally conical;
said plug including an apex and circular periphery, with holes extending through said plug and grooves intersecting the holes and extending between the apex and periphery for fluid communication across said plug;
a substantially opaque liquid normally disposed within the sealed chamber between said lens and said plug in order to block visibility of said plug through said lens; and
actuator means including a stem operatively associated with said diaphragm and extending out the other end of said transition mount for actuating said plug toward said lens in order to displace said liquid and thereby visually expose said plug through said lens.

14. The indicator of claim 13, wherein said transition mount extends through a hole in the wall of a storage bin, and wherein said actuator means includes:
a resilient collar disposed between said transition mount and the outside of the bin wall; and
a locking nut threaded onto said transition mount in engagement with the inside of the bin wall.

15. The indicator according to claim 14, wherein said actuator means further includes;
a housing threaded onto the other end of said transition mount;
a pivotal arm having an upper end disposed within an opening in said housing and a lower end depending therefrom;
means for pivotally supporting the upper end of said arm within said housing;
said arm including a raised portion adjacent the upper end thereof for engaging the stem of said actuator means;
a second resilient diaphragm disposed between the other end of said transition mount and said housing for sealing purposes;
a resilient bellows connected between said housing and said arm; and
an angled material-bearing plate secured to the lower end of said arm.

16. A visual indicator, comprising:
means including a conical lens and a resilient diaphragm defining a sealed chamber therebetween, said lens having inside and outside surfaces;
a filler plug disposed within the chamber, said plug being movable toward and away from said lens;
said plug having a conical front side facing the opposite complementary inside surface of said lens, and a back side;
means for normally biasing said plug away from said lens;
means defining at least one passage for fluid communication across said plug;
a substantially opague liquid normally disposed within the chamber between the lens and said plug in order to block visibility of said plug through the lens;
an actuator stem associated with said diaphragm for actuating said plug toward said lens in order to displace said liquid and thereby visually expose the plug; and
means for slideably supporting said actuator stem for movement toward and away from said diaphragm.

17. The visual indicator of claim 16, wherein said lens is substantially transparent; and wherein said lens, filler plug, and actuator stem are constructed from plastic.

18. The visual indicator of claim 16, wherein said plug includes an apex and circular periphery, with holes extending through said plug and grooves in the front side thereof intersection and extending between the apex and periphery for fluid communication across said plug.

19. The visual indicator of claim 16, wherein said actuator stem has opposite ends, with the end adjacent said diaphragm being enlarged and the other end being of non-circular cross-section to minimize friction with said supporting means.

20. The visual indicator of claim 16, further including:
means for actuating said actuator stem.

* * * * *